United States Patent [19]

Foresman

[11] Patent Number: 4,539,927

[45] Date of Patent: Sep. 10, 1985

[54] TELESCOPING POLE

[76] Inventor: Robert R. Foresman, 26902 Paseo Cardero, San Juan Capistrano, Calif. 92675

[21] Appl. No.: 485,438

[22] Filed: Apr. 15, 1983

[51] Int. Cl.³ .............................................. B63B 15/00
[52] U.S. Cl. ........................................ 114/89; 52/121
[58] Field of Search ...................... 114/39, 89, 90, 95, 114/102, 103, 104, 105, 108, 109, 123, 124, 221 R; 52/121, 146; 182/66, 207, 208; 212/267; 343/883

[56] References Cited

U.S. PATENT DOCUMENTS

| 2,128,712 | 8/1938 | Neff | 52/121 |
| 3,464,379 | 9/1969 | Lawson | 114/102 |
| 4,151,534 | 4/1979 | Bond | 343/883 |

*Primary Examiner*—Jesus D. Sotelo
*Attorney, Agent, or Firm*—G. Donald Weber, Jr.

[57] ABSTRACT

There is described an extendable telescoping pole which can be locked in an extended position. The pole includes a rope or line which can be manually adjusted to thereby continuously adjust the length of the pole. The line can be locked in position to assure that the pole remains at the appropriate extended length.

13 Claims, 7 Drawing Figures

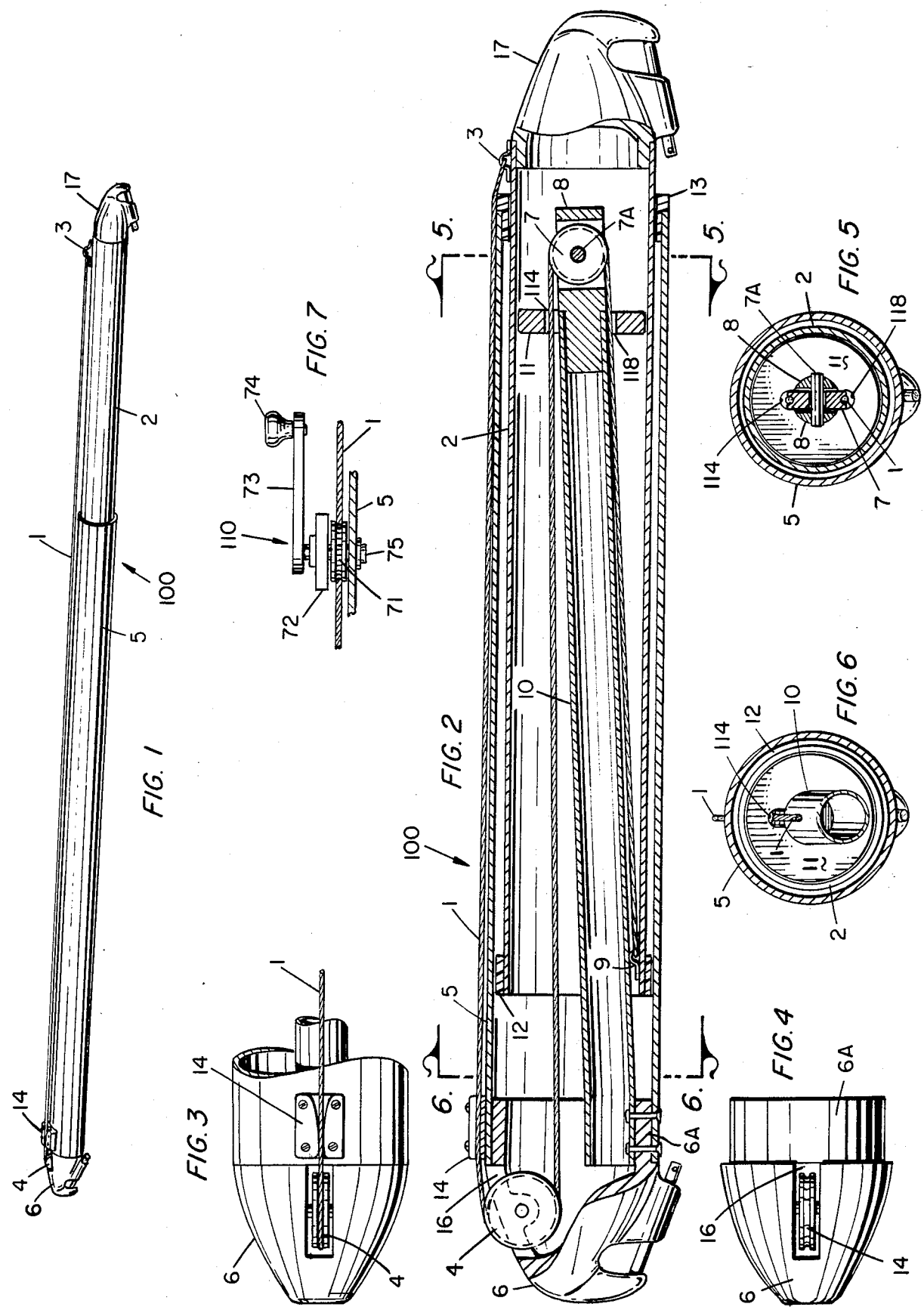

TELESCOPING POLE

BACKGROUND

1. Field of the Invention

This invention is directed to extendable poles, in general, and to adjustable whisker poles, in particular.

2. Prior Art

There are many examples of extendable poles known in the prior art. One example is known as a whisker pole which is used in conjunction with sailboats. That is, fixed length whisker poles tend to be relatively short in length. Whisker poles which are intended to be of any substantial length, for example on the order of 27 feet or the like, are selectively extendable and include one or more parts which are telescoped into each other to permit a relatively short unit when not in operation. When the known telescoping poles are extended, internal twist locks or spring-loaded, lock-buttons are used to maintain the poles in the extended position. These known whisker poles generally tend to be adjustable only in certain incremental lengths (e.g. 8 or 12 inch steps) and are somewhat difficult to collapse or telescope to the closed position. That is, the extended poles usually have to be brought inboard of the vessel and adjusted either by extending or retracting the parts while inboard. The spring-loaded lock-button needs to be depressed or the ends of the twist-lock telescoping poles need to be twisted to unlock (or lock) the pole for operation. These poles sometimes encounter difficulty due to corrosion or other types of damage.

The operation of the known devices is frequently cumbersome inasmuch as a rather lengthy whisker pole, for example 8 to 27 feet in length, is unwieldy and difficult to maneuver in the close confines of many sailboats. This is particularly a problem because the adjustment at the outer portion of the pole may be difficult to reach. Moreover, this operation frequently requires unlatching both the inboard and the outboard ends of the whisker pole from the appropriate fittings whereupon much time can be lost. In addition, once the pole is detached at each end, it is highly susceptible to being lost overboard or the like.

SUMMARY OF THE INSTANT INVENTION

The extendable pole of the instant invention comprises a plurality of telescoping elements which are fitted within each other in typical telescoping fashion. In this instance, a line or rope is connected to the exterior of the innermost one of the telescoping members at one end thereof and to the exterior of this same telescoping member at the other end thereof. Appropriate sheaves or pulleys are mounted within the respective telescoping members and the line is passed therearound in a continuous fashion. A suitable cleat apparatus is provided near the inboard end of the outer pole element wherein the line can be snugly fastened to prevent movement thereof. By feeding the line in the appropriate direction at the inboard end of the pole, the pole is caused to telescope outwardly (or inwardly in the appropriate case). The line is then fastened to the cleat apparatus and the pole remains rigidly maintained in the position selected.

BRIEF DESCRIPTION OF THE DRAWINGS

FIG. 1 is an overall view of a telescoping whisker pole of the instant invention.

FIG. 2 is a cross-sectional view of a portion of the whisker pole of the instant invention.

FIG. 3 is an enlarged view of a jam cleat which can be used with the instant invention.

FIG. 4 is another view of the inboard sheave mounting and end fitting of the instant invention.

FIG. 5 is an end view of the outboard sheave mounting taken along the lines 5—5 in FIG. 2.

FIG. 6 is a view of the internal arrangement of the pole of the instant invention taken along the lines 6—6 of FIG. 2.

FIG. 7 is a schematic view of an optional crank mechanism for moving the line of the whisker pole of the instant invention.

DESCRIPTION OF A PREFERRED EMBODIMENT

Referring now to FIG. 1 there is shown an exterior view of the whisker pole 100 of the instant invention. The pole includes an inner, extendable portion 2 and an outer portion 5. A line 1, formed of rope, nylon line or the like is connected to the pole as described in detail infra. The latch fittings 6 and 17 are fitted to the ends of the outer and inner portions, respectively.

Referrring now to FIG. 2, there is shown a cross-sectional view of a whisker pole 100 of the instant invention. Latches 6 and 17 are mounted at opposite ends of the whisker pole 100. The latches shown are of the piston style but other latches can be utilized.

The outer tube member 5 is attached at the inboard end thereof to inboard latch 6. The inner telescoping tube unit 2 is mounted within tube element 5. The relative internal diameter of element 5 and outer diameter of element 2 are such that the tubes fit together compactly but are able to slide relative one to the other. A suitable line or rope 1 is provided. Line 1 is affixed to a suitable fitting 3 such as an eye-strap or the like which is attached to the outer surface of inner element 2 by pop rivets or some other suitable fastener.

A sheave 4 is mounted at the inner end of outer element 5. In point of fact, the sheave 4 may, preferably, be mounted in a cavity 16 in latch 6, if so desired.

The line 1 goes around sheave 4, along the inner opening of elements 2 and 5 and passes around the internal sheave 7 which is mounted in a fitting 8 within inner tube element 2. The line 1 continues through the internal channel or bore through the tubing members and is affixed to a suitable fitting 9, such as an eye-strap, which is mounted, in suitable fashion, internally of the cylinders, in particular, at the inner end of the inner member 2.

Thus, line 1 is seen to be affixed to fitting 3 at the outer end of inner tube element 2. It passes around sheaves 4 and 7 and is then affixed, at a suitable fitting 9, to the internal inboard end of inner tube element 2. It is clear that the line 1 comprises a fixed loop arrangement. By manually moving line 1 the inner and outer telescoping tube elements 2 and 5 can be moved as well. For example, by moving the uppermost section of line 1 to the right (as shown in FIG. 2), a force is applied to fitting 9 wherein the fitting and the inner element 2 tend to move toward the right.

Conversely, when the line 1 is moved toward the left, the inner element 2 also moves to the left in response to the forces applied to element 2 at fitting 3. As well, line 1 moves around sheaves 4 and 7 because of the connection to fitting 9.

In some embodiments, spacers 12 and 13 may be provided. These spacers can be made of polyvinyl chloride, Delrin or any other suitable plastic material which will not corrode. The spacers or sleeves 12 and 13 operate to keep the inner and outer tube elements 2 and 5 separated and aligned. Thus, friction is minimized and smoother operation is achieved. In the embodiment shown in FIG. 2, sleeves 12 and 13 are affixed to tubes 2 and 5, respectively.

A central tube 10 is affixed to the inboard end of the outer tube element 5. Central tube 10 extends substantially axially along the central bore or opening in tube elements 2 and 5. In the arrangement shown in FIG. 2, the central tube 10 is inclined slightly so that the free end thereof is essentially disposed in the center of the bores of tube elements. Central tube 10 extends from the inboard end of tube 5 to quite near the outboard end thereof. Clearly, the longer the extension of central tube 10, the longer the extension of the pole 100 when fully extended.

It should be noted that central tube 10 can be mounted to outer tube element 10 by rivets, screws or the like. As shown in FIG. 2, the central tube 10 is also mounted to the inner end 6A of end latch 6.

In an alternative arrangement, the central tube 10 can be mounted in a sleeve (not shown) centrally located in the end of tube element 5. In this arrangement, tube 10 need not be inclined.

The fitting 8 is mounted at the outer end of central tube 10. Essentially, fitting 8 can be fabricated of a plastic material, metal or the like. However, plastic is less susceptible to corrosion and is, therefore, preferable. Typically, fitting 8 is adapted to mount and support sheave 7 therein by means of axle 7A. Sheave 7 is, thus, established as a reference location and force point for line 1.

As shown in FIG. 2, fitting 8 may include a flange 11 which includes apertures 114 and 118 therethrough. Flange 11 and the apertures cause line 1 to be properly aligned so that binding thereof does not occur. Of course, flange 11 can be a separate disk which can perform the same function, i.e. line alignment as well as positioning of the end of central tube 10. That is, tube 10 is, effectively, maintained in the center of tube 2 and does not bind or jam the extendable pole.

The jam cleat 14 is attached to the outer surface of outer element 5 by any appropriate means such as rivets or the like. Jam cleat 14 is used to secure line 1 in a fixed position once the pole 100 has been extended to the desired length. Of course, the cleat apparatus can be a horn cleat or any other suitable means for restraining line 1.

As best seen in FIG. 3, jam cleat 14 has an open, V-shaped groove 30 therein. This groove tapers from a large or wide opening at one end to a small or narrow opening at the other end. The line 1 is essentially forced into groove 30 where line 1 is wedged and unable to move. In order to adjust pole 100, line 1 is removed from jam cleat 14, moved appropriately (in or out) and then wedged into groove 30 again. As noted, the jam cleat 14 is only one illustrative cleat apparatus.

FIG. 4 shows another view of end latch 6 with its collar 6A extending therefrom. Collar 6A mates with and snugly engages the inboard end of outer tube element 5. A cavity 16 is formed in end latch 6 to provide a suitable mounting arrangement for sheave 4. This arrangement is preferred inasmuch as sheave 4 is disposed out of the way and in a protected location. Of course, sheave 4 can be mounted externally of outer tube element 5 and/or end latch 6 if so desired.

FIG. 5 is an end view of the fitting 8 with flange 11. The mounting arrangement of sheave 7 on axle 7A relative to fitting 8 is depicted. The relation of flange 11 (disk) is also shown. Furthermore, the shapes of the fitting 8 and flange 11 are illustrative only. The relative shapes can be different if there is any significant purpose to be served thereby.

Referring to FIG. 6, there is shown a view of the interior arrangement of the instant invention taken along the lines 6—6 in FIG. 2. The concentricity of the inner and outer tubes 2 and 5 along with the relationship of flange 11 and aperture 114 is also shown. The inclined arrangement of central tube 10 is depicted along with a portion of sleeve 12. As noted above, the respective dimensions and shapes of the several parts can be altered so long as any conflicts therebetween are avoided.

FIG. 7 shows an optional crank 110 which can be used with the invention. In use, crank 110 is mounted to outer tube element 5 by a suitable means such as rivets, screws or the like. One or more knurled wheels 71 are rotatably mounted in the crank. A guide member 72 can be mounted above the wheel 71. Appropriate washers, spacers, and the like are included. A lever arm 73 is rotatably mounted in crank 110 and is arranged to drive wheel (or wheels) 71. A knob 74 may be advantageously mounted at the end of lever arm 73. One type of crank which can be used is made by Hood Yacht Systems and is known as Line Drive (TM).

Typically, when lever arm 73 is turned around pivot 75, wheel 71 is rotatably driven. Wheel 71 is used to engage line 1 and move the line as the wheel is turned. Line 1 is, effectively, confined between tube element 5 and guide member 72.

As suggested supra, a pair of wheels 71 can be used with the line 1 retained therebetween. Conversely, line 1 can be looped around wheel 71 for positive traction control. The details of crank 110 construction can be varied to fit the particular desires or requirements of any whisker pole arrangement.

Thus, there is shown and described a unique, extendable pole. The pole may take the form of a whisker pole which is useful for sailing vessels. However, other applications of the pole are contemplated, also. The pole includes inner and outer telescoping elements. While only two such elements are shown, any appropriate number can be provided. The description made herein is intended to be illustrative only and is not intended to be limitative. For example, the drive line may be a chain if so desired. Any modifications to this pole which fall within the purview of this description are intended to be included therein as well. The scope of this invention is limited only by the claims appended hereto.

Having thus described a preferred embodiment of this invention, what is claimed is:

1. An extendable pole comprising,
a first tube member (5),
a second tube member (2) axially disposed within said first tube member,
elongated drive means (1) conected to the opposite ends of said second tube member, and
guide means for supporting said elongated drive means relative to said first and second tube members,
said guide means includes first sheave means disposed adjacent one end of said first tube member, and second sheave means disposed within said second tube member adjacent the other end of said first tube member,
said elongated drive means arranged to pass around both of said first and said second sheaves.

2. The pole recited in claim 1 wherein,
said guide means includes central support means disposed within said second tube member to support said second sheave means.

3. The pole recited in claim 2 wherein,
said central support means includes an elongated tubular member.

4. The pole recited in claim 1 including,
first latch means joined to one end of said first tube member, and
second latch means joined to one end of said second tube member.

5. The pole recited in claim 1 including,
cleat means attached to said first tube member and arranged to selectively engage said elongated drive means.

6. The pole recited in claim 1 including,
driver means mounted at one of said first and second tube members and adapted to engage said elongated drive means to selectively apply force thereto so as to move said drive means and one of said first and second tube members.

7. The pole recited in claim 2 including,
flange means for positioning said central support means within said second tube member.

8. The pole recited in claim 4 wherein,
said first and second latches are piston-type latches.

9. The pole recited in claim 1 wherein,
said elongated drive means comprises a rope.

10. The pole recited in claim 1 wherein,
said first and second tube members are fabricated of aluminum.

11. The pole recited in claim 4 wherein,
said latches are fabricated of a plastic material.

12. The pole recited in claim 1 wherein,
said elongated drive means is connected to the exterior of one end of said second tube member and to the interior of the other end of said second tube member.

13. The pole recited in claim 1 including,
spacers between said first and second tube members.

* * * * *